Patented June 17, 1930

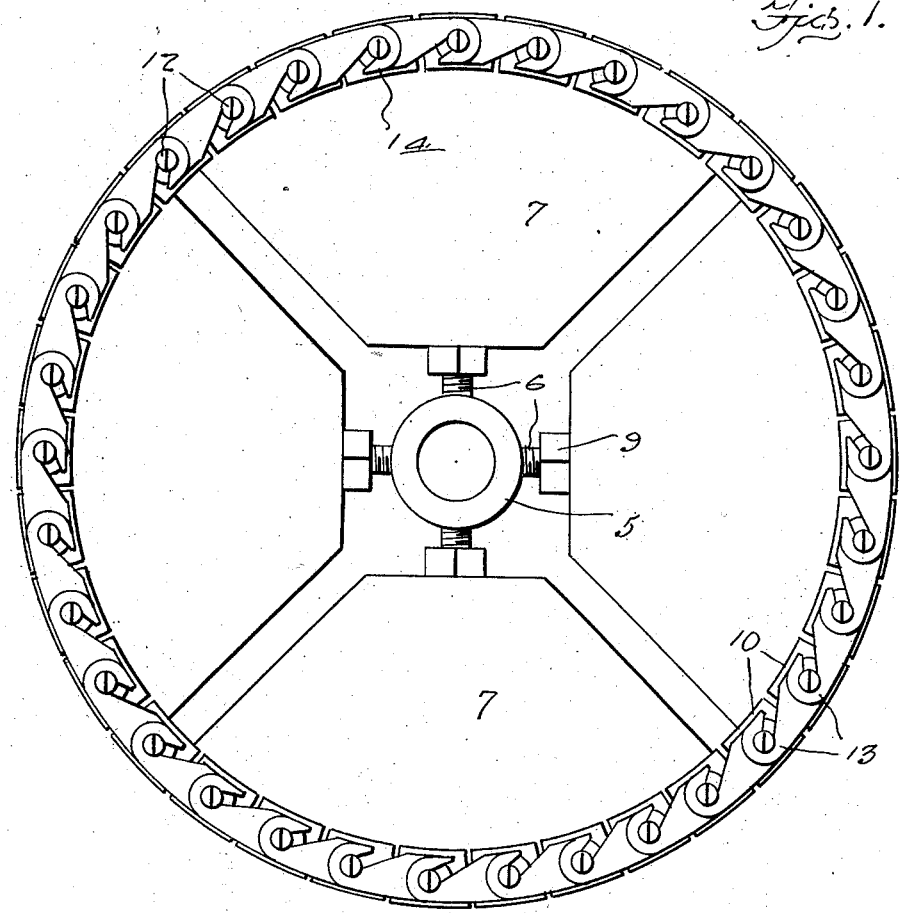
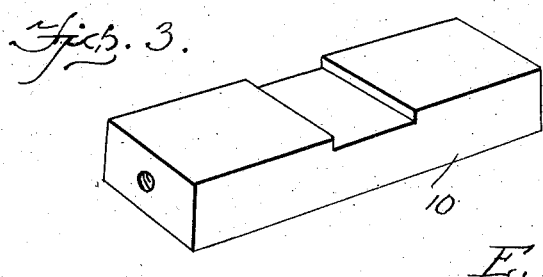

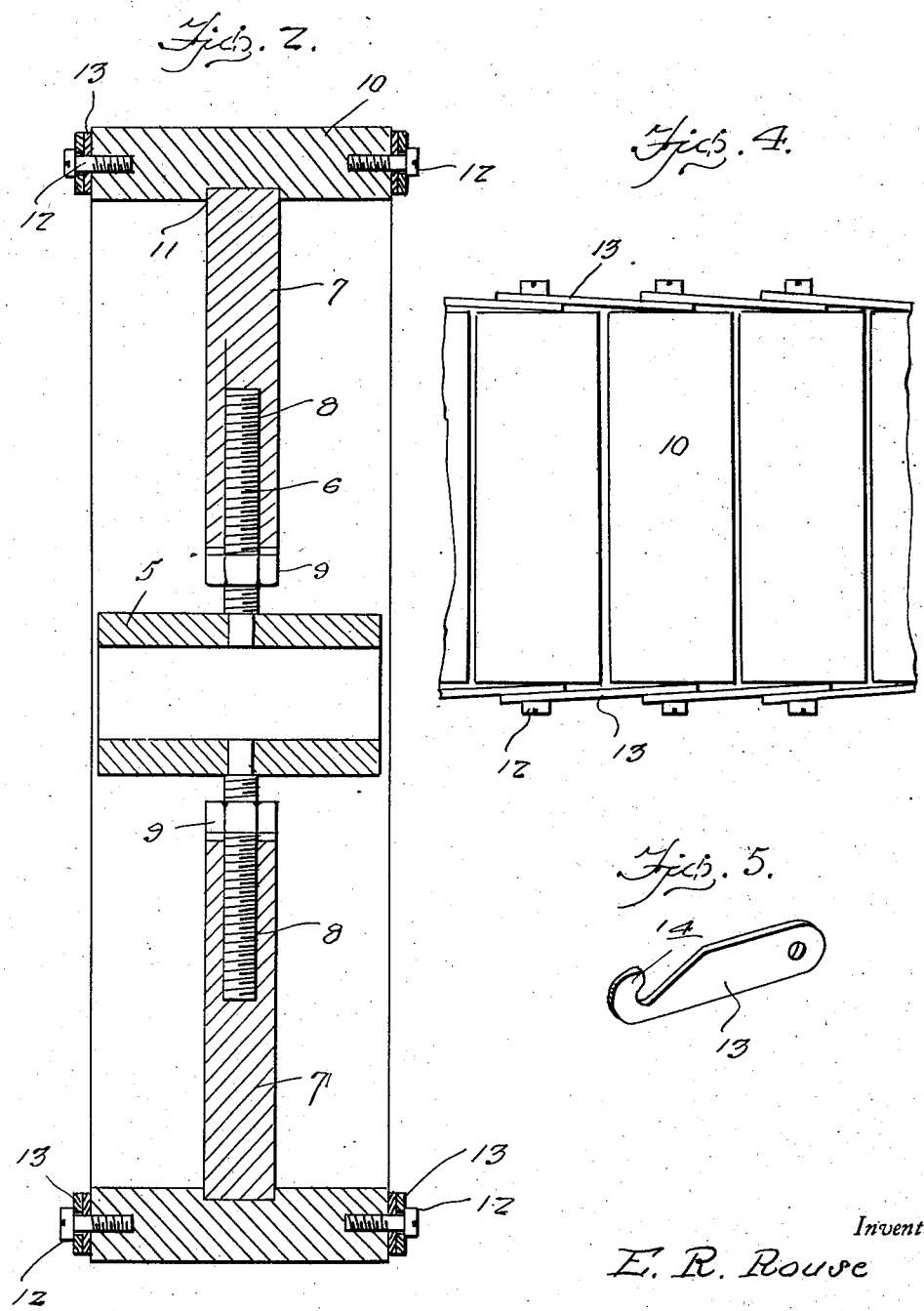

1,764,855

UNITED STATES PATENT OFFICE

ELMER R. ROUSE, OF ROLFE, IOWA

ADJUSTABLE BELT PULLEY

Application filed June 7, 1928. Serial No. 283,554.

This invention relates to new and useful improvements in belt pulleys for machinery and aims to provide a novel, simple, and inexpensive pulley construction whereby the sides of the same may be readily changed to meet varying conditions.

A most important object of the invention resides in the provision of a pulley of this character wherein the size of the same may be quickly changed, and this without requiring any unusual skill on the part of the mechanic.

With the foregoing and other objects in view as the nature of the invention will be better understood, the same comprises the novel form, combination and arrangement of parts hereinafter more fully described, shown in the accompanying drawings and claimed.

In the accompanying drawings wherein like reference characters indicate corresponding parts throughout the same:

Figure 1 is a side elevation of my improved adjustable belt pulley.

Figure 2 is a vertical transverse section therethrough.

Figure 3 is an inner face perspective of one of the blocks forming the face or periphery of the pulley.

Figure 4 is a fragmentary face or peripheral view of the pulley, and

Figure 5 is a perspective of one of the connecting links provided between adjacent ends of the face or peripheral blocks.

Now having particular reference to the drawings, my novel pulley consists of a suitable hub collar 5 provided intermediate its ends and at predetermined points with radiating threaded bolts 6, the inner ends thereof being rigidly secured to the hub collar 5 in any desired manner.

Furthermore, the pulley consists of a web structure composed of a plurality of segmental plates 7 similar in number to the number of bolts 6, the inner ends of these segments being in each instance formed with an unthreaded socket 8 opening at the inner edge thereof, and adapted to receive the complemental bolts 8 as clearly disclosed in Figure 2.

A nut 9 is threaded upon each bolt between the segments and collar as in Figures 1 and 2. Further the pulley includes a peripheral or face band composed of a plurality of blocks 10 of predetermined length and width, the inner face of which is formed intermediate its ends with a transversely extending channel 11 for the reception of the periphery of the segmental plate 7, see Figure 2. Threaded within threaded sockets at the opposite ends of these blocks 10 are machine screws 12—12 to which are loosely pivoted interconnecting links 13—13. The free ends of these links are formed with hooks 14 for engagement over the ends of the machine screws 12—12 of the next adjacent block 10 outwardly of the links of said next adjacent block as clearly indicated in Figures 1 and 5. Obviously the circumference of the peripheral or face band of the pulley may be increased or diminished by increasing the number of the said blocks 10. In actual practice the peripheral or face band is made up by a plurality of the interconnected blocks and the band then arranged upon the segmental plate web of the pulley. The nuts 9 are then turned outwardly upon the bolts 6 for moving the segmental plates outwardly into tight engagement with the band.

Obviously by turning the nuts 9 inwardly the segmental plates of the web may be then slid inwardly upon the bolts, after which the band may be removed from the webs. It will thus be seen that I have provided a novel, simple, and extremely useful adjustable belt pulley that is well adapted for all the purposes heretofore designated, and even though I have herein shown and described the invention as consisting of certain detail structural elements it is nevertheless to be understood that some changes may be made therein without affecting the spirit and scope of the appended claims.

Having thus described the invention, what I claim is:—

1. In an adjustable belt pulley of the character described, a hub member, an expansible web associated with the hub, a facing for the web forming the periphery of the pulley and consisting of a plurality of detachably associated segments adapted to be loosely arranged upon the periphery of the expansible web after which the web is expanded for tightly securing the facing to the web.

2. In an adjustable belt pulley of the character described, a hub member, an expansible web unit associated therewith, a facing band consisting of a plurality of block members, and detachable connections between the opposite ends of said block member, said facing band adapted to be arranged loosely upon the web after which the web is expanded for tightly securing the facing thereto.

In testimony whereof I affix my signature.

ELMER R. ROUSE.